March 4, 1958 R. C. SPOTT 2,825,800
LIGHT DIFFUSING ASSEMBLY
Filed Aug. 22, 1955 3 Sheets-Sheet 1

INVENTOR.
ROBERT C. SPOTT
BY
Townsend, Townsend and Hoppe
ATTORNEYS

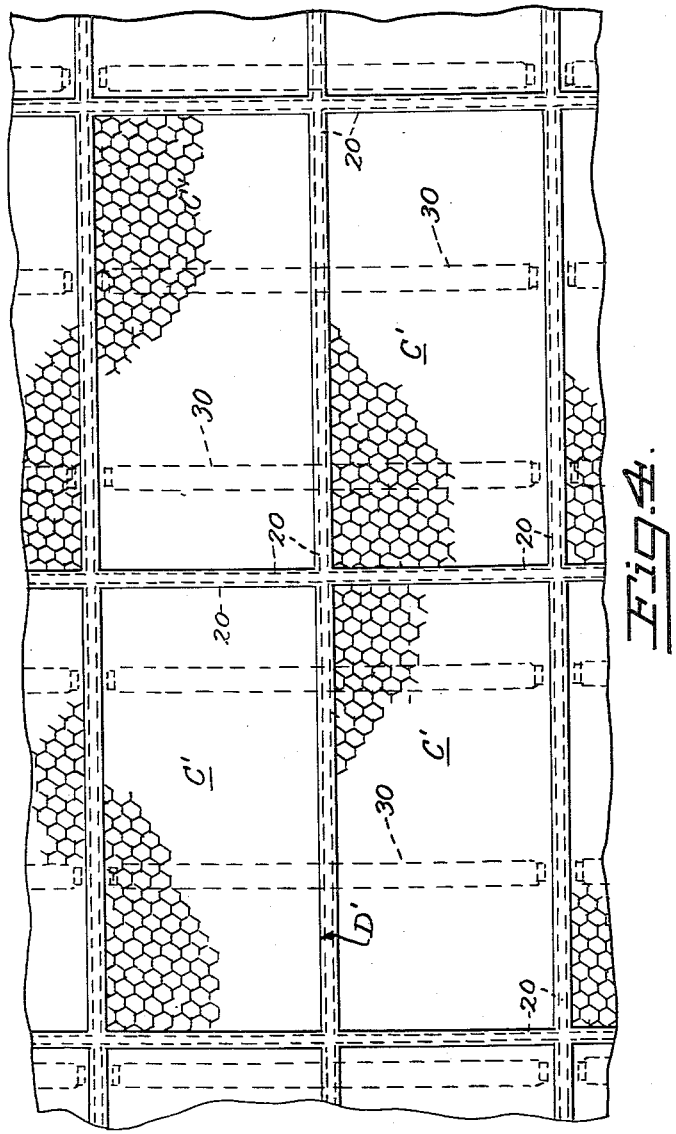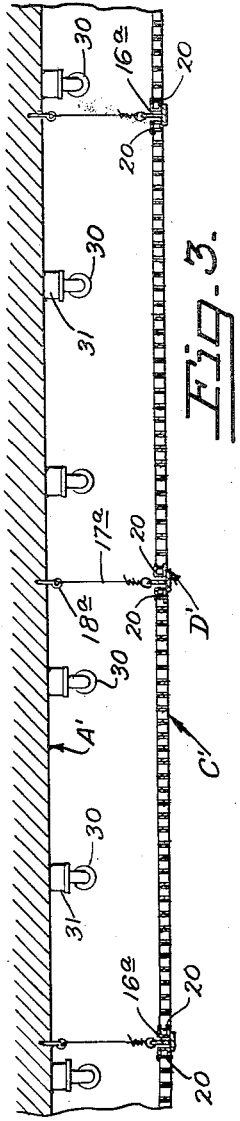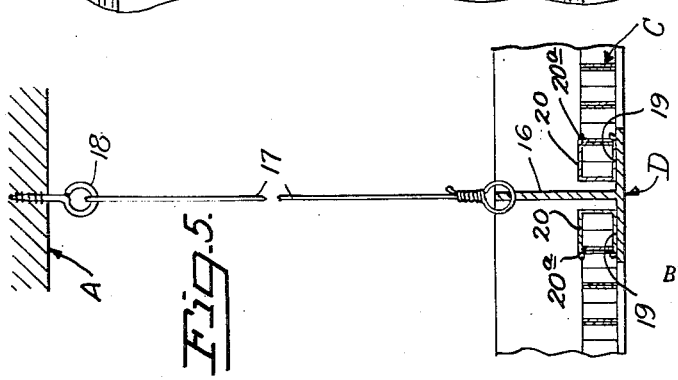

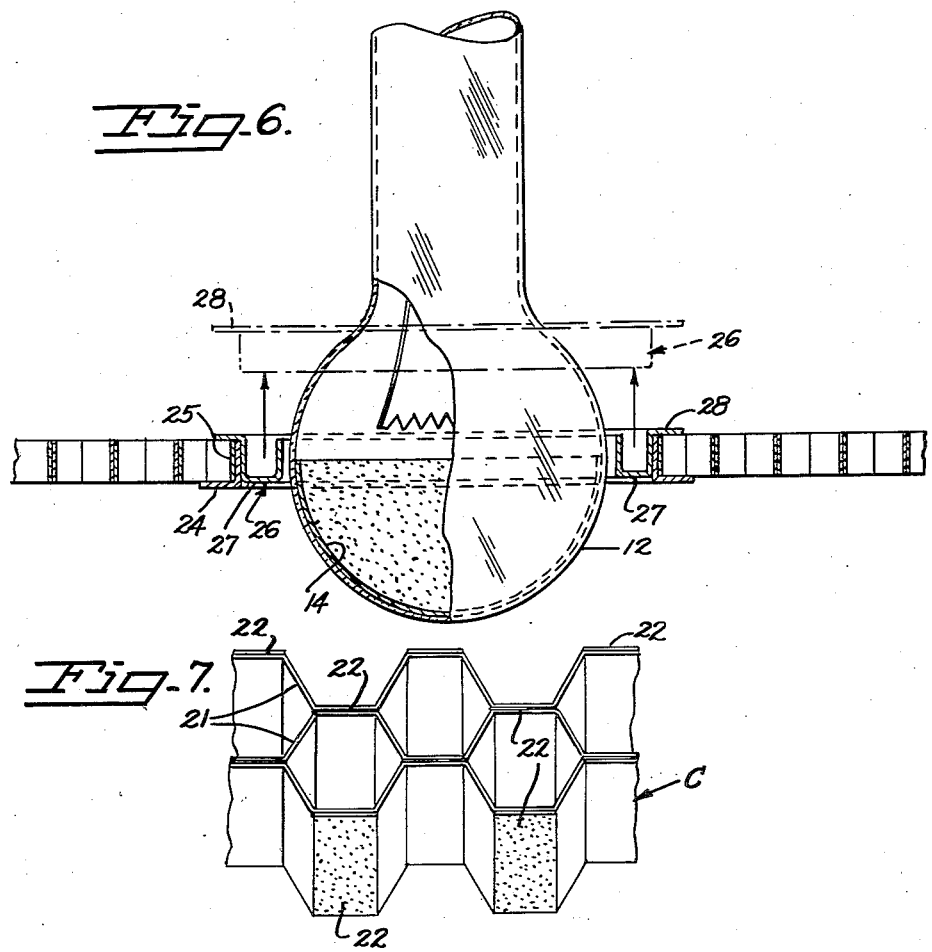
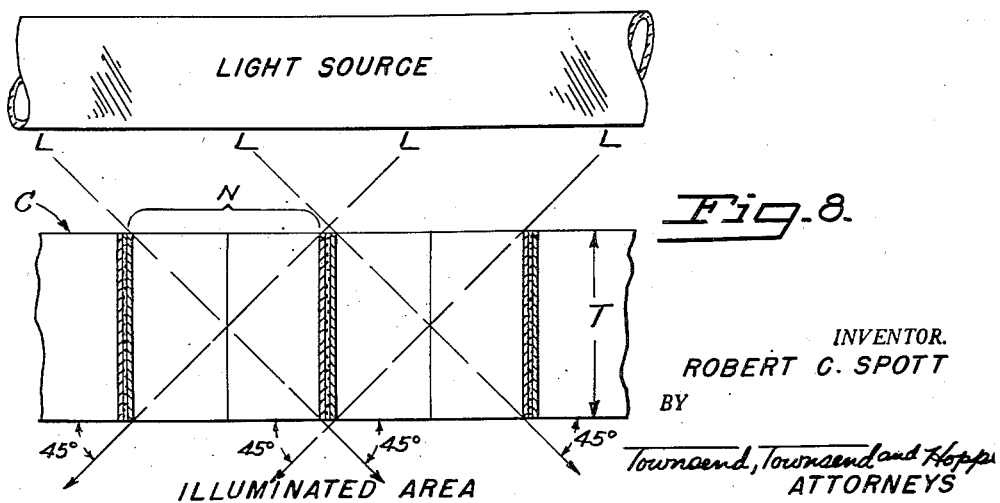

United States Patent Office 2,825,800
Patented Mar. 4, 1958

2,825,800

LIGHT DIFFUSING ASSEMBLY

Robert C. Spott, Orinda, Calif., assignor to Hexcel Products Inc., Oakland, Calif., a corporation of California Application August 22, 1955, Serial No. 529,784

1 Claim. (Cl. 240—78)

This invention relates to a new and improved light diffusing assembly.

The several embodiments of the invention illustrated in the drawings and to be described hereinafter in more detail each is shown as comprising a relatively flat section of etched metal foil cellular honeycomb material suspended between a light source and the area to be illuminated. The etched surface of the metal foil material establishes a matte finish operable to reflect between about 75% to 90% (and preferably about 85%) of incident white light emanating from the light source through the honeycomb material. Furthermore, a matte finish having the above characteristics reduces the surface brightness of the metal foil and thereby minimizes bothersome light glare but does not reduce to any substantial extent the light transmissive qualities of the open cellular honeycomb material. Further, in the preferred embodiment of the invention, the nominal cell size and thickness of the honeycomb material are correlated to provide a cut-off angle of between 35° to 65° (usually about 45°) of light transmitted from the light source through the cellular openings of the honeycomb.

A principal object of the present invention therefore is to provide a structure of the character briefly mentioned above incorporating an extremely efficient cellular honeycomb diffusing medium but which is also capable of transmitting 95% of the light emanating from the light source.

Another feature of the invention is that the matte finished metal foil honeycomb, although providing an efficient light diffusing and transmitting medium, is of sufficiently reduced surface brightness as not to cause annoying or eye-fatiguing glare.

Another feature is that the metal foil honeycomb material has acoustical properties very similar to conventional acoustical ceiling materials and thus provides advantages in establishing desired conditions of acoustics as well as illumination.

Additionally, the metal foil honeycomb material is noncombustible and hence presents no fire hazard whatsoever. Further, the open cellular construction of the honeycomb adapts the material for suspension under overhead fire prevention sprinkler heads.

Another advantage of the open cell construction of the honeycomb paneling is that no loss of air circulation will result from an overhead or ceiling installation, and it is also possible to place either the outlet or inlet sides of various units, such as air conditioning, heating, or vapor exhaust units above the honeycomb paneling.

Additional subsidiary objects and advantages of the invention is that the honeycomb material weighs only a very few ounces per square foot which, for practical purposes, eliminates any injury hazard that might be related to an overhead suspension system. Furthermore, the honeycomb material effectively screens from normal vision or line of sight existing overhead surface utility installations such as water and steam pipes, sprinkler heads, wiring, fans, or other units.

Other numerous objects and advantages of the invention will become apparent upon reading the following specification and referring to the accompanying drawings in which similar characters of reference represent corresponding parts in each of the several views.

In the drawings:

Fig. 3 is a fragmentary vertical sectional view of a typical fluorescent light ceiling installation embodying the invention.

Fig. 4 is a partially schematic bottom plan view of the installation shown in Fig. 3.

Fig. 5 is an enlarged fragmentary vertical sectional view showing the T-bar suspension means.

Fig. 6 is an enlarged fragmentary vertical sectional view of the lamp and lamp adapters shown in Figs. 1 and 2.

Fig. 7 is an enlarged fragmentary perspective view of a panel section of light diffusing honeycomb material.

Fig. 8 is an enlarged sectional view of a honeycomb panel section showing the light cut-off angle.

Figure 1:
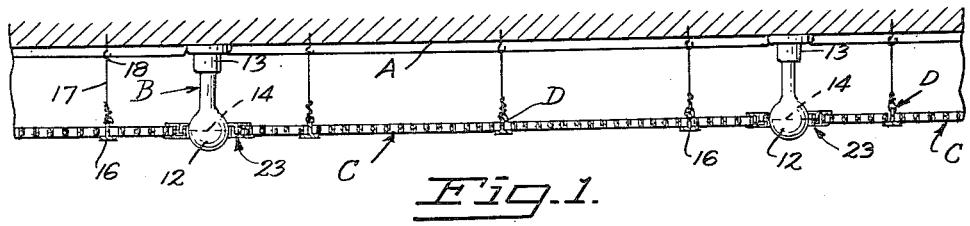
Fig. 1 is a fragmentary vertical sectional view of a typical incandescent light ceiling installation embodying the invention.
Figure 2:
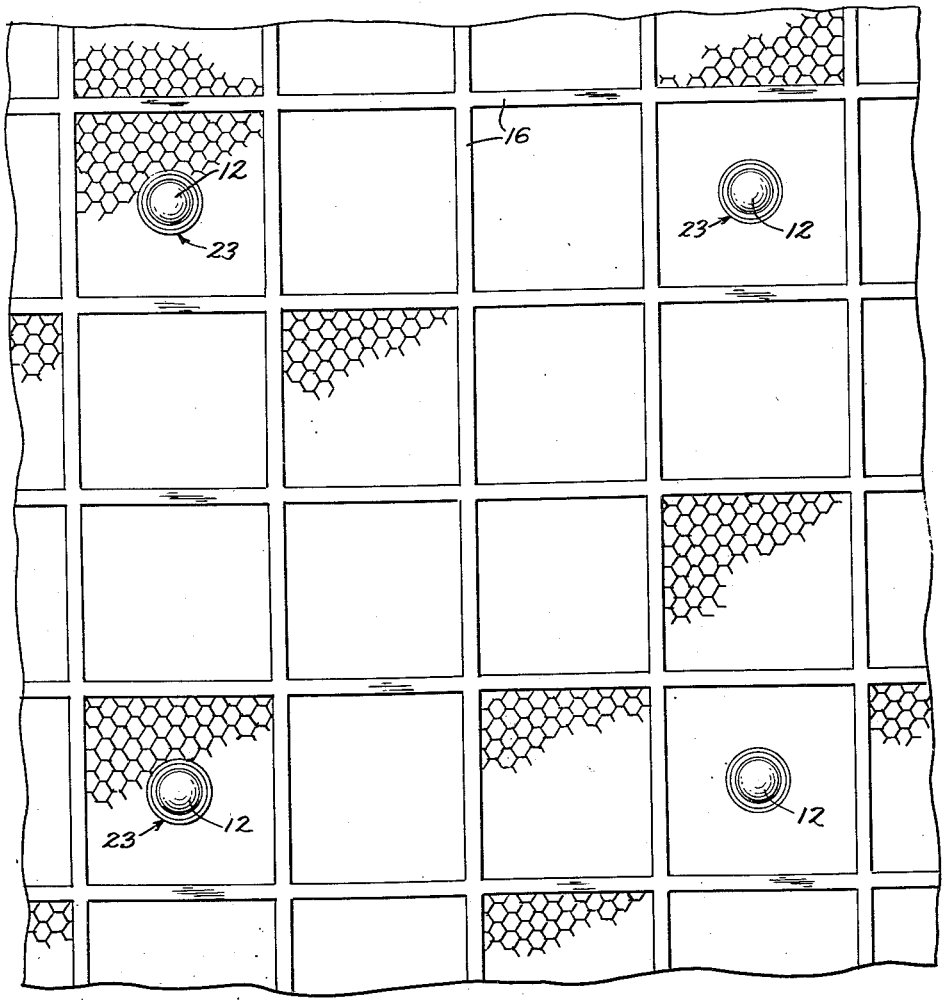
Fig. 2 is a paritally schematic bottom plan view of the installation shown in Fig. 1.

Referring now more specifically to Figs. 1 and 2 of the drawings, the installation therein illustrated is shown as comprising generally a ceiling surface A, a plurality of incandescent lamps and related fixtures B, a plurality of cellular honeycomb light diffusing panel sections C which in turn are supported in spaced relation below ceiling A by T-bar hangers or suspension means, indicated generally at D.

The components heretofore designated generally at A, B and D may be considered substantially conventional and well known in the art of ceiling lighting or paneling. It will suffice to remark that the underside of ceiling surface A from which the lamp fixtures B and hangers D depend is preferably painted white so as to provide a high degree of light reflectance.

Further, the lamp fixtures 13 supporting incandescent lamps 12 are screwed, bolted or otherwise supported in usual fashion directly to the ceiling surface A.

In order to secure maximum degree of uniformly distributed indirect or reflected light and to eliminate localized points of brightness or glare where the lamps 12 are located, it is preferable to utilize silvered or aluminized lamp bulbs of the type indicated in the drawings. More specifically, there are commercially produced and available today lamb bulbs in which the lower half of the bulb is coated with light reflectant matter indicated at 14, substantially opaque to direct light transmission and, in the installation shown, functions to reflect light from the incandescent filament upwardly toward the white ceiling surface A.

The hanger assembly heretofore indicated generally at D is shown as comprising an open grid T-bar suspension of a type well known in the art and commercially available on the market. One satisfactory suspension assembly is manufactured by Lok-Products Co. having offices in Los Angeles, California, under the commercial name and style "Drive-Lok." It will suffice to remark that this type of suspension comprises an open grid of rectangularly criss-crossed inverted T-bars 16 interlocked together and suspended in spaced relation below the ceiling by suspension wires 17 connected to eye-screws 18 or the like anchored to the ceiling structure. The grid openings established by the T-bar suspension of this type are each defined by a peripheral flange or ledge 19 for supporting the margins of the honeycomb panels heretofore designated D.

Although the size of the grid openings of the T-bar suspension may be varied according to particular job specifications, the installation indicated in Figs. 1 and 2 indicate both the longitudinally and transversely extending parallel T-bars as being spaced 24 inches apart and with the lamps 12 equidistantly spaced from one another 6 feet apart and in such manner that each lamp centrally overlies a grid opening in the T-bar suspension. As will more fully appear, the silvered or aluminized coated bottom hemispheres of the lamp bulbs project through the light diffusing honeycomb material B and below the plane of the T-bar suspension D.

The light diffusing honeycomb material, as illustrated fragmentarily in Fig. 7, comprises a plurality of individual webs or ribbons 21 of aluminum foil or similar metal foil formed in generally corrugated pattern throughout their length and bonded at their adjacent nodes by suitable adhesive substance 22. The bonded corrugated webs define a substantially hexagonal cell configuration with the vertical axes of the cells extending parallel to one another and substantially perpendicular to the flat sides of the honeycomb panels.

The honeycomb material is cut in square or rectangular sections corresponding in dimension to the size of the T-bar hanger grids. It is desirable to provide each section or panel of the honeycomb material with a marginal edge binding comprising thin metal channel bars (made from aluminum or similar material) indicated at 20. The channel edge binding may be secured in place simply by clamping the inner extremities 20$^a$ of the pieces into engagement with the honeycomb material to provide a press fit.

The metal foil webs 21 are formed with a matte surface or finish of a type operable to reflect between about 75% to 90% (and preferably 85%) of incident white light. The desired matte finish may be established by enameling the surfaces of the honeycomb material with a suitable paint or similar coating, or the matte finish may be formed by either mechanically or chemically etching the metal foil material. Although the characteristics of the matte finish is defined with reference to its ability to reflect white light, it is appreciated that the invention is not limited to white light illumination, but may be employed in conjunction with various colored light sources desired.

Although the angle of light cut-off may also be varied according to particular requirements or specifications in different installations, it has been found that in the great majority of ceiling installations where it is desired to provide efficient diffused lighting, the angle of light cut-off should aproximate 45°. The angle of light cut-off that will be obtained in utilizing hexagonal honeycomb material of the type heretofore described is a function of the ratio between the nominal cell size of the honeycomb and the thickness of the material. By "nominal cell size" is meant the average distance between opposed flats of the honeycomb cells such as indicated at "N" in Fig. 8. The thickness of the material is equal, of course, to the distance between flat sides of the honeycomb such as indicated by reference line "T" in Fig. 8. The angle of cut-off as used herein and the claim means the maximum angle of divergence that light rays "L" can be transmitted from the light source through the cellular material as measured with reference to the flat or horizontal plane of the honeycomb section. In Fig. 8 the ratio between nominal cell size (N) and thickness (T) of the material is 1:1 which establishes an angle of cut-off illustrated and referenced at substantially 45°. In commercial practice, an extremely satisfactory installation may be made utilizing honeycomb panels ¼" thick and having a ¼" nominal cell size, and being made of .0045" gauge aluminum foil chemically etched to establish an 85% light reflectant uniform matte finish.

In the incandescent lamp installation indicated in Figs. 1 and 2 and as previously indicated, the aluminized or silvered bottom halves of the lamp project below the plane of the light diffusing honeycomb material C. By projecting the lamps below the honeycomb in this fashion, space between the ceiling surface and the honeycomb may be conserved. Lamp adapters, indicated generally at 23, may also be utilized to provide a convenient means for removing or changing individual lamp bulbs without having to disassemble the T-bar suspension or the honeycomb panels supported thereby. More specifically and referring particularly to Fig. 6, a circular opening 25 may be formed in the honeycomb material of substantially larger diameter than the equator of the lamp bulb which is adapted to project therethrough. The opening is reinforced with a flanged hoop or ring 24 inserted and held within the circular opening 25 in press fit engagement. An adapter ring, indicated generally at 26, and having an interior diameter only slightly larger than the equator of the bulb is adapted to be supported on reinforcing hoop 24 to fill the space or gap between the reinforced opening and the lamp bulb. Adapter ring 26, in cross-section, defines a U-shaped channel or body portion 27 having a laterally projecting top outer flange 28 which, when properly positioned, rests upon the reinforced opening 25 in the honeycomb material.

When it is desired to remove or replace one of the lamps 12, it is only necessary for a person to push upwardly against the adapter ring 26 to unseat it from its normal position. Unseating of ring 26 establishes sufficient clearance between the lamp bulb 12 and reinforced opening 25 for an operator to manually grasp the bulb in the usual fashion to screw or unscrew the lamp bulb into or out of engagement with reference to its socket 13.

Figs. 3 and 4 illustrate a typical installation constructed in accordance with the invention but in which the light source comprises fluorescent tubes 30 mounted in bracket fixtures 31 which in turn are supported to the underside of the ceiling surface A'. The T-bar suspension hanger D' and the honeycomb light diffusing panels C' may be considered substantially identical in construction and function to the elements D and C described specifically with reference to Figs. 1 and 2. Accordingly, the various component elements shown in Figs. 3 and 4 which correspond to equivalent elements shown in Figs. 1 and 2 are numbered similarly except that the reference numerals in Figs. 3 and 4 are suffixed by the letter "a" to distinguish them in the drawings. In the installation as shown in Figs. 3 and 4, the fluorescent tubes are shown spaced apart approximately 18 inches, and the grid openings of the T-bar hanger assembly and the honeycomb light diffusing panels supported therein are shown as being approximately 2' x 4' in dimension.

In both of the installations shown in Figs. 1 and 2 and in Figs. 3 and 4, respectively, the light from the lamps or fluorescent tubes and the light reflected from the ceiling surface A is transmitted and diffused through the hexagonal cell openings of the honeycomb material to provide an extremely efficient, nonglare illumination. Additionally, each of the above described installations possesses all of the features and is capable of fulfilling all of the numerous objects and advantages heretofore ascribed to the invention.

It is also understood that the scope of the invention is not limited to the specific lighting applications described above. Advantageous and efficient utilization of etched metal foil honeycomb material as a light diffusing medium for lamp fixtures, or other types of lighting installations other than those specifically indicated above, may also be made.

Although the present invention has been described in some detail by way of illustration and example for purposes of clarity of understanding, it is understood that certain changes and modifications may be made within the spirit of the invention as limited only by the scope of the claim appended hereto.

What is claimed is:

In combination with a light source, light diffusing means, comprising: a flat section of honeycomb material made from thin metal foil web material defining substantially hexagonal cell openings of uniform size; said flat section disposed between said light source and the area to be illuminated; the surfaces of said metal foil web material having a matte finish of a type operable to reflect between about 75% to 90% of incident white light; the nominal cell size and thickness of said flat section of honeycomb correlated to provide a uniform cut-off angle of light transmitted from said light source through said section of between about 35° to 65°.

References Cited in the file of this patent

UNITED STATES PATENTS 2,680,502  Kurtzon _____ June 8, 1954

FOREIGN PATENTS 633,090  Great Britain _____ Dec. 12, 1949
697,728  Great Britain _____ Sept. 30, 1953